US009558332B1

(12) United States Patent
Keiser et al.

(10) Patent No.: US 9,558,332 B1
(45) Date of Patent: Jan. 31, 2017

(54) VIRTUAL COMMUNICATION DEVICE INTERFACES

(75) Inventors: Luke Keiser, Frisco, TX (US); Scott Passe, Forney, TX (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 548 days.

(21) Appl. No.: 13/441,997

(22) Filed: Apr. 9, 2012

(51) Int. Cl.
  *G06F 21/62* (2013.01)
  *G06F 21/31* (2013.01)

(52) U.S. Cl.
  CPC ........... *G06F 21/31* (2013.01); *G06F 21/6218* (2013.01)

(58) Field of Classification Search
  CPC .... G06F 21/31; G06F 21/6218; G06F 3/0481; G06F 21/34; G06F 3/04842; H04L 63/0861; H04L 63/0853
  USPC ........................................ 340/5.52
  See application file for complete search history.

(56) References Cited

U.S. PATENT DOCUMENTS

| | | | | |
|---|---|---|---|---|
| 2002/0116641 A1* | 8/2002 | Mastrianni | ..................... | 713/201 |
| 2004/0019650 A1* | 1/2004 | Auvenshine | .................. | 709/206 |
| 2006/0195326 A1* | 8/2006 | Okezie et al. | ..................... | 705/1 |
| 2006/0271400 A1* | 11/2006 | Clements et al. | ................. | 705/2 |
| 2006/0285667 A1* | 12/2006 | Hodge | ..................... | 379/142.05 |
| 2006/0293570 A1* | 12/2006 | Croghan et al. | .............. | 600/300 |
| 2007/0100216 A1* | 5/2007 | Radcliffe et al. | .............. | 600/300 |
| 2008/0256458 A1* | 10/2008 | Aldred et al. | ................. | 715/741 |
| 2009/0076832 A1* | 3/2009 | Collins | ............................. | 705/1 |
| 2009/0080715 A1* | 3/2009 | van Beek et al. | ............. | 382/118 |
| 2010/0199189 A1* | 8/2010 | Ben-Aroya et al. | .......... | 715/736 |
| 2011/0047473 A1* | 2/2011 | Hanna et al. | .................. | 715/740 |
| 2012/0166210 A1* | 6/2012 | Langcaon et al. | ................ | 705/2 |
| 2012/0240220 A1* | 9/2012 | Smith | ..................... | G06F 21/34 726/17 |
| 2013/0311364 A1* | 11/2013 | Shipman et al. | ................ | 705/41 |

* cited by examiner

*Primary Examiner* — An T Nguyen
(74) *Attorney, Agent, or Firm* — Fogarty, L.L.C.

(57) ABSTRACT

Systems and methods for virtual communication device interfaces are disclosed. In some embodiments, a method may include receiving identification from a resident (e.g., an inmate or prisoner) of a controlled-environment facility (e.g., a jail or prison) and authenticating the resident based upon the identification. The method may also include retrieving, from one or more of a plurality of electronic information sources over a computer network, information associated with the resident. The method may further include subjecting the information to a security protocol, the security protocol configured to identify a first portion of the information that is suitable for disclosure to the resident and a second portion of the information that is unsuitable for disclosure to the resident. The method may then include withholding the second portion of the information from the resident and providing the first portion of the information to the resident.

21 Claims, 4 Drawing Sheets ent based upon the identification. The method may also include retrieving information associated with the resident from one or more of a plurality of electronic information sources over a computer network, and providing the information to the resident. In some implementations, the identification may include at least one of biometric information, a radio frequency identification (RFID) code, a personal identification number, or a bar code. Moreover, the controlled-environment facility may be a jail or prison, and the resident may be an inmate or prisoner.

VIRTUAL COMMUNICATION DEVICE INTERFACES

TECHNICAL FIELD

This specification relates generally to information technology, and, more particularly, to virtual communication device interfaces.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors may receive shorter sentences to be served in jail (e.g., county jail). While incarcerated, a prisoner or inmate may interact with a number of different entities including, for example, the facility's administration, commissary, medical service provider, etc. Moreover, the inmate or prisoner may access certain types of information technology (IT) systems including, for example, telephone communications system, video visitation systems, etc.

The inventors hereof have recognized, however, there is currently no electronic or automated mechanism capable of aggregating and/or providing information to inmates about matters related to these various entities and services in a suitable manner.

For instance, if an inmate wishes to find out his or her expected release date from the facility, they may have to wait for an opportunity to physically travel the facility's administration's office and ask a clerk or officer. If the inmate would like to know their visitation schedule, they may have to wait for a chance to query the visitation system (or the administration). And in some cases, there may simply not be a way to obtain certain information. For example, if the inmate needs to be reminded to take certain medication or refill a drug prescription, the facility may not be capable of communicating this information to them.

In light of these, and other concerns, the inventors hereof have developed the virtual communication device interfaces described herein.

SUMMARY

Embodiments disclosed herein are directed to systems and methods for developing, manufacturing, deploying, providing, and/or operating virtual communication device interfaces. In an illustrative, non-limiting embodiment, a method may include receiving identification from a resident of the controlled-environment facility and authenticating the resident based upon the identification. The method may also include retrieving information associated with the resident from one or more of a plurality of electronic information sources over a computer network, and providing the information to the resident. In some implementations, the identification may include at least one of biometric information, a radio frequency identification (RFID) code, a personal identification number, or a bar code. Moreover, the controlled-environment facility may be a jail or prison, and the resident may be an inmate or prisoner.

In some cases, the electronic information sources may include an administration and management system, which may be hosted within and/or outside of a controlled-environment facility, and the information may include data related to one or more of: an elapsed residency period, a remaining residency period, a commitment date, a release date, or a hearing schedule. Additionally or alternatively, the electronic information sources may include a communication system, and the information may include data related to one or more of: a call history, an address book, or a balance available in a calling account. Additionally or alternatively, the electronic information sources may include a cafeteria database, and the information may include data related to one or more meals served at the controlled-environment facility. Additionally or alternatively, the electronic information sources may include a commissary system, and the information may include data related to at least one of: a purchase history, a commissary item price list, or a commissary package account balance. Additionally or alternatively, the electronic information sources may include a medical database, and the information may include data related to one or more of: an appointment or a prescription. Additionally or alternatively, the electronic information sources may include a video visitation system, and the information may include data related to the resident's past, present, or future visitation schedule. Additionally or alternatively, the electronic information sources may include a third-party content provider accessible over the Internet, intranet, or private networks, and the information may include data related to one or more of: news, weather, stocks, sports, entertainment, or electronic media.

In some cases, retrieving the information may further include identifying a preferences file associated with the resident based, at least in part, upon the identification, the preferences file indicating one or more types of information selected by the resident, and retrieving information corresponding to the one or more selected types. Moreover, providing the information may further comprise converting the information from a text format to a graphical or audio format and reproducing the converted information to the resident through the computing device.

In some implementations, providing the information may include subjecting the information to a security protocol, the security protocol configured to identify a first portion of the information that is suitable for disclosure to the resident and a second portion of the information that is unsuitable for disclosure to the resident, withholding the second portion of the information from the resident, and providing the first portion of the information to the resident. For example, the second portion of the information may include an identification of the source of the information and/or be associated with a score equal to or greater than a threshold value.

In another illustrative, non-limiting embodiment, a method may include receiving, from an electronic information source over a computer network, information related to a resident of a controlled-environment facility. The method may also include subjecting the information to a security protocol, the security protocol configured to identify a first portion of the information that is suitable for disclosure to the resident and a second portion of the information that is unsuitable for disclosure to the resident. The method may further include transmitting the first portion of the information to an electronic device disposed within the controlled-environment facility, the electronic device configured to authenticate the resident and to provide the first portion of the information to the resident.

For example, subjecting the information to the security protocol may include using at least one of an image recognition or optical character recognition algorithm to assign a score to one or more portions of the information. Further, the first portion of the information may be associated with a first score lesser than a threshold value and the second portion of the information may be associated with a score equal to or greater than the threshold value, the threshold value indicating suitability of disclosure to the resident.

In yet another illustrative, non-limiting embodiment, a method may include receiving identification from a resident of a controlled-environment facility and authenticating the resident based upon the identification. The method may also include retrieve information associated with the resident from one or more of a plurality of electronic information sources over a computer network, and subjecting the information to a security protocol, the security protocol configured to identify a first portion of the information that is suitable for disclosure to the resident and a second portion of the information that is unsuitable for disclosure to the resident. The method may then include withholding the second portion of the information from the resident and providing the first portion of the information to the resident.

In some cases, to provide the first portion of the information to the resident, the method may include converting the first portion of the information from a text format to a graphical or audio format and reproducing the converted first portion of the information to the resident. Also, to identify the first and second portions of the information, the method may include using at least one of an image recognition or optical character recognition technique to assign a first score to a first portion of the information and a second score to a second portion of the information, where the first score is smaller than a threshold value and the second score is greater than the threshold value, the threshold value indicating suitability of disclosure to the resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for developing, manufacturing, deploying, providing, and/or operating virtual communication device interfaces. Generally speaking, the various techniques described herein may find applicability in a wide variety of environments (e.g., residences, businesses, etc.). In some cases, however, these systems and methods may be particularly well suited for deployment within controlled-environment facilities. Furthermore, although described in some examples as a telephone interface, the systems and methods disclosed herein may be applicable to a number of other communication devices (e.g., portable computers, tablets, etc.)

Various types of controlled environment facilities are present in today's society, and persons may be voluntary or involuntary residents of such facilities, whether temporarily or permanently. Examples of controlled environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled environment facility may be referred to as a jail or prison, and its residents may be referred to as arrestees, detainees, or inmates. It should be understood, however, that the systems and methods described herein may be similarly applicable to other types of controlled environment facilities and their respective residents (e.g., a hospital and its patients).

Figure 1:
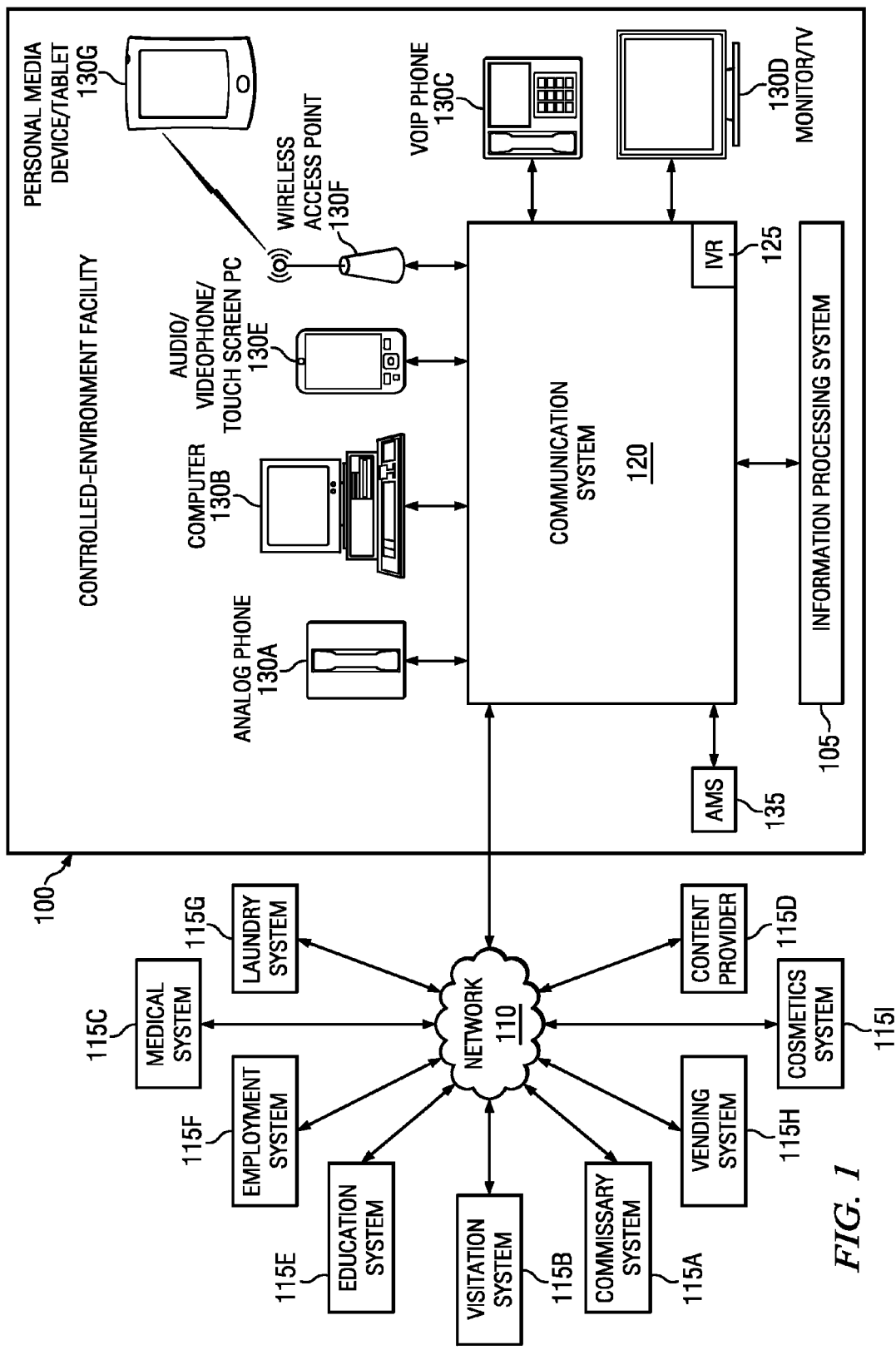
FIG. 1 is a diagram of a controlled-environment facility according to some embodiments.

Turning to FIG. 1, a block diagram of a controlled-environment facility is depicted according to some embodiments. Communication system 120, which may include or otherwise be coupled to interactive voice response (IVR) system 125, is coupled to administration and management system 135. In addition, communication system 120 may be coupled to a variety of communication devices, such as, for example, analog phone 130A, computer 130B, voice over IP (VoIP) device 120C, monitor or television 130D, portable media consumption device 130E (e.g., an audio device, a videophone, a touchscreen PC, etc.), or the like. Communication system 120 may also be coupled to personal media device or tablet 130G, for example, via wireless access point 130F.

In the context of a correctional facility, inmates may use devices 130A-G to access certain communication services. In some facilities, one or more of devices 130A-G may be disposed within a kiosk or other suitable location within controlled-environment facility 100. For example, an inmate may initiate telephone services by lifting the receiver on telephone 130A, at which time the inmate may be prompted to provide a personal identification number (PIN), scan a radio frequency identification (RFID) bracelet, or other identifying information or biometric sample (e.g., thumbprint, voice print, iris scan, etc.). IVR unit 125 may generate and play prompt or other messages to inmates on devices 130A-G. Under the control of communication system 120, devices 130A-G may be capable of connecting to a non-resident's (i.e., a person not committed to controlled environment facility 100) device (e.g., a telephone, etc.) across network 110. To this end, communication system 120 may include one or more analog switches, IP gateways, PBX systems, etc. that provide communication capabilities to controlled-environment facility 100. In some implementations, communication system 120 may also include a database configured to store inmate's call histories, address books, calling account balances, etc., although some or all of this information may also be stored in AMS 135.

Again, to provide some of its services, communication system 120 may be configured to interface with network 110. Network 110 may in turn may include any suitable wired or wireless/mobile network including, for instance, computer networks, the Internet, Plain Old Telephone Service (POTS) networks, third generation (3G), fourth generation (4G), or Long Term Evolution (LTE) wireless networks, Real-time Transport Protocol (RTP) networks, or any combination thereof. In some embodiments, at least portions of network 110 may implement a Voice-over-IP (VoIP) network or the like. As illustrated, communication system 120 is coupled via network 110 to commissary system 115A, visitation system 115B, medical system 115C, third-party content provider 115D, education system 115E, employment system 115F, laundry system 115G, vending system 115H, and cosmetics system 115I. It should be noted that these systems are provided as examples only. In other implementations, one or more systems 115A-I may be absent and/or other such systems may be added.

In addition to providing certain communication capabilities, communication system 120 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in administration and management system (AMS) 135. In addition to PAC list(s), AMS 135 may also store inmate or resident profile data (RPD). As such, AMS 135 may include information such as balances for inmate trust and other accounts; trial schedule; conviction data; criminal record; sentencing data, such as time served, time remaining to be served, and release date; cell and cellmate assignments; inmate restrictions and warnings; telephone call history; call recordings; known or suspected gang or criminal affiliations; known or suspected affiliates, accomplices, or gang members; and any other information that may be relevant or useful to correctional facility staff to house and maintain inmates (e.g., cafeteria menus or schedule, visitation hours, etc.).

Commissary system 115A may include one or more computer systems configured to process and/or facilitate commissary transactions. As such, system 115A may include a database containing, for one or more inmates within controlled-environment facility 100, an account number, an account balance, a transaction or purchase history, etc. Furthermore, commissary system 115A may also include a price list of items (e.g., snacks, personal hygiene items, electronics, etc.) currently in stock or otherwise available for purchasing by each inmate. In some cases, an inmate may pre-order one or more items for later delivery. Also, certain inmates (or groups of inmates) may not be allowed to purchase certain items, categories of items, or packages, may have a limit in the number of items that may be purchased, a maximum number of transactions, total transaction amount, etc. Therefore, in order to process a given transactions request, commissary system 115A may interact with AMS 135 to check whether the request is allowed by identified one or more commissary transactions rules associated with the requesting inmate. Additionally or alternatively, a price list may be generated for each particular inmate that takes one or more restrictions into account (e.g., inmate A may receive a price list showing a television and inmate B may receive a different list that does not show the television, inmate C may be allowed to purchase up to a maximum quantity of a particular item that is greater than what inmate D is permitted, etc.).

Visitation system 115B may include one or more computer systems configured to facilitate remote visitation (e.g., video and/or audio). For example, visitation system 115B may include a video visitation server configured to allow an inmate (or a non-resident of facility 100) to request or schedule a visitation to be conducted at a later time. System 115B may establish or facilitate a secure connection between one of devices 130A-G and a non-resident's device according to the schedule. In some cases, system 115B may interact with AMS 135 to implement one or more security procedures. For instance, visitation system 115B may store past, present, and future visitation schedule, it may ensure that the visitation is conducted between authorized individuals, and it may perform monitoring and/or recording operations.

Medical system 115C may include one or more computer systems configured to provide, schedule, manage, and/or deliver medical services within facility 100. For example, medical system 115C may receive requests for medical treatment from inmates (e.g., using devices 130A-G), schedule doctor visits or appointments (in-person visits or remote visits), store and process drug prescription information, etc. Additionally or alternatively, medical system 115C may process invoices and bills related to the inmates' treatment. In some cases, information stored in medical system 115C may be subject to legal regulations such as, for example, the Health Insurance Portability and Accountability Act (HIPAA) of 1996 or the like. Accordingly, medical system 115C may be configured to enforce mechanisms to ensure that applicable regulations are followed with respect to medical data storage and communication.

Third-party content provider 115D may include any content provider that can be accessed through a network such as network 110. For example, provider 115D may include an Internet website or server, a news website or server, a weather website or server, a financial information (e.g., stocks, etc.) website or server, an entertainment website or server, a social network website or server, a search engine or server, etc. In some cases, provider 115D may allow inmates to purchase electronic books, movies, music, games, etc. to be reproduced within facility 100 via devices 130A-G. Also, in some cases, content provider 115D may include an advertisement server configured to deliver electronic ads to one or more of devices 130A-G. In order to implement security rules associated with each particular inmate, in some cases, AMS 135 may store information regarding which provider 115D may be accessed (or not accessed), which types of contents may be purchased (or not purchased), etc.

Education system 115E may include one or more computer systems configured to provide and/or manage education services (e.g., distance learning, continuing education, etc.). As such, system 115E may include a database containing, for one or more inmates within controlled-environment facility 100, student identification numbers, enrollment information, degree program, credits earned, attendance, transcripts, etc. Employment system 115F may include one or more computer systems configured to provide and/or manage employment services (e.g., in-jail programs, work-release programs, etc.). As such, system 115F may include a database containing, for one or more inmates within controlled-environment facility 100, worker identification number, work assignments, work history, resume, current/open job opportunities, work schedule, pay rate, amount earned, tax withholdings, etc. Laundry system 115G may include one or more computer systems configured to provide and/or manage laundering services. As such, system 115G may include a database containing, for one or more inmates within controlled-environment facility 100, laundry schedules, cost or laundry price lists, outstanding requests, etc. Vending system 115H may include one or more computer systems configured to provide and/or manage vending services. As such, system 115H may include a database containing, for one or more inmates within controlled-environment facility 100, an item list, an item price list, a vending machine location map (e.g., within facility 100), item request forms, etc. Cosmetics system 115I may include one or more computer systems configured to provide and/or manage cosmetic sales services. As such, system 115I may include a database containing, for one or more inmates within controlled-environment facility 100, a cosmetic product list, a cosmetic price list, a product order form, an appointment schedule for rendering cosmetic services (e.g., hairdressing, etc.), or the like.

In some embodiments, information processing system 105 may interact with one or more of systems 115A-I through communication system 120 via network 110. Particularly, information processing system 105 may be configured to retrieve one or more pieces of information (i.e., "facts") from any of systems 115A-I, for example, at the request of an inmate (e.g., as indicated in a preferences file stored within system 105) operating devices 130A-G. As such, system 105 may be employed to implement a virtual interface for any of communication devices 130A-G.

As such, information processing system 105 may collect various facts from systems 115A-I, perform one or more operations upon those facts, and transmit information related to those facts to devices 130A-G for display or reproduction within facility 100. Examples of operations may include, for instance, converting text to audio, converting audio to text, recognizing images, implementing a security protocol, determining which facts are suitable for reproduction according to the security protocol, etc. These and other operations are discussed in more detail with respect to FIGS. 4 and 5 below. Although shown as a separate system, in some cases information processing system 105 may also be incorporated into communication system 120 and/or one or more of communication devices 130A-G (e.g., tablet 130G).

Moreover, it should be noted that each of systems 115A-I has been depicted outside of facility 100 in FIG. 1 for sake of illustration, but that in other implementations one or more of systems 115A-I may be located, at least in part, within facility 100. Conversely, although AMS 135 in shown within facility 100, in other implementations AMS 135 may reside, at least in part, outside of facility 100. Additionally or alternatively, information processing system 105 and/or communication system 120 may reside, at least in part, outside of facility 100.

Figure 2:
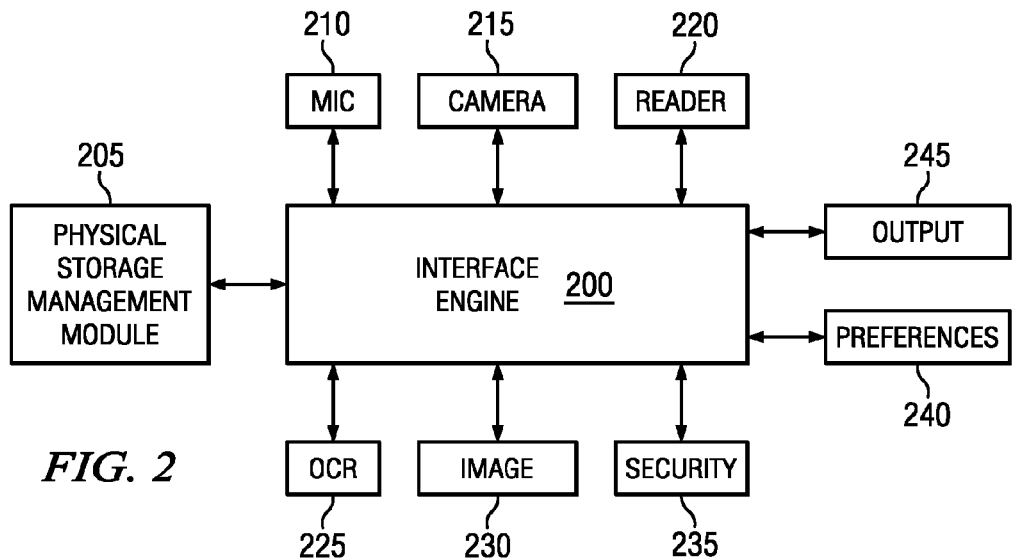
FIG. 2 is a block diagram of a communication device interface software program according to some embodiments.

Turning now to FIG. 2, a block diagram of a system interface software program is depicted. In various embodiments, the software program may be implemented, at least in part, by information processing system 105. Additionally or alternatively, one or more of communication devices 130A-G may implement the software program at least in part. As illustrated, interface engine 200 is coupled to physical storage management module 205, audio input(s) or microphone module(s) 210, camera module(s) 215, reader module(s) 220, OCR module(s) 225, image processing module(s) 230, security module(s) 235, preferences module(s) 240, and output module(s) 245.

In some embodiments, interface engine 200 may manage the process of acquiring information to be presented to an inmate (e.g., from systems 115A-I and/or AMS 135) as part of the interface of one or more of communication devices 130A-G. Particularly, interface engine 200 may be configured to retrieve one or more preference files from module 240 that indicate the types of information or facts desired or needed by a given inmate. For example, a preferences file may indicate an inmate wishes to receive information about his calling account balance, PAC list, commissary account balance, lunch menu, and any scheduled visitations. As such, interface engine 200 may be configured to retrieve information or facts from one or more of systems 115A-I and/or AMS 135 that satisfies those requests.

In some cases, an inmate's preferences file may also include information added by the facility's administration or another third party independently of the inmate's wishes. For example, if it is determined an inmate is taking certain prescription medications, his or her preferences file may also indicate that corresponding facts be retrieved from medical system 115C, for example, to identify whether it is time for a refill, etc. Similarly, if there is an upcoming legal hearing scheduled, the preferences file may also indicate that such information be retrieved from AMS 135. Accordingly, in some implementations, each inmate may have his or her individual interface preferences stored as a preferences file (e.g., weather in a particular city, a given stock price, a selected type of news, etc.). In addition to or independently of the preferences file, the facility's administration may further select one or more types of information that will become part of a communication device's interface, whether individually or as a group (e.g., date of commitment or incarceration, expected release, parole hearing, etc.).

Physical storage management module 205 may be configured to maintain a database of information retrieved from sources 115A-I and/or AMS 135. In some cases, each fact or information may be time stamped so that interface engine 200 may avoid having to retrieve recently obtained facts over network 110. Furthermore, whereas certain types of information may be stored separately for each individual inmate (e.g., medical or personal data), other types of commonly requested information may be stored in a global repository for access by different processes (e.g., data corresponding to a request for local weather may be retrieved once for all inmates).

Audio input or microphone module 210 may be configured to obtain voice samples and/or commands, for example, to authenticate an inmate (e.g., using voice recognition) and/or to perform one or more data retrieval operations. Similarly, camera 215 and RFID reader 220 may be configured to perform one or more inmate authentication operations (e.g., iris scan, facial recognition, RFID bracelets, etc.). OCR module 225 may be configured to perform an OCR or handwriting recognition operation upon an image obtained by interface engine 200 and to convert that image to searchable text. In addition to recognizing text, OCR module 225 may also recognize the language used, and automatically translate the resulting text into a different language (e.g., Spanish to English, etc.).

Image and speech processing module 245 may be configured to identify images or audio retrieved by interface engine 200. For example, in some cases, module 245 may be configured to recognize pornographic or otherwise improper material, identify individual faces, objects, places, etc. Image and speech processing module 245 may also be configured to perform text-to-speech (TTS) and/or speech-to-text (STT) operations upon certain types of audio content. Security module 235 may be configured to implement one or more restrictions and/or security protocols. For example, security module 235 may be configured to perform keyword searches (e.g., an OCR'd version of a graphical image, an STT'd version of an audio file, etc.) and to flag offensive content. In some cases, a set of security rules may be associated with each inmate (or group of inmates) and stored within module 235. These security rules may determine whether certain information (or portions thereof) is suitable or unsuitable for disclosure to a given inmate.

In some embodiments, output module 245 may be configured to deliver information as part of the interface of communication devices 130A-G, for example, via communication system 120. In embodiments where the system interface software program of FIG. 2 is executed within one or more of devices 130A-G, however, output module may include a display module and/or an audio output module. As such, output module 245 may be configured to present a graphical and/or audio user interface (e.g., via IVR 125) to one or more inmates.

Figure 4:
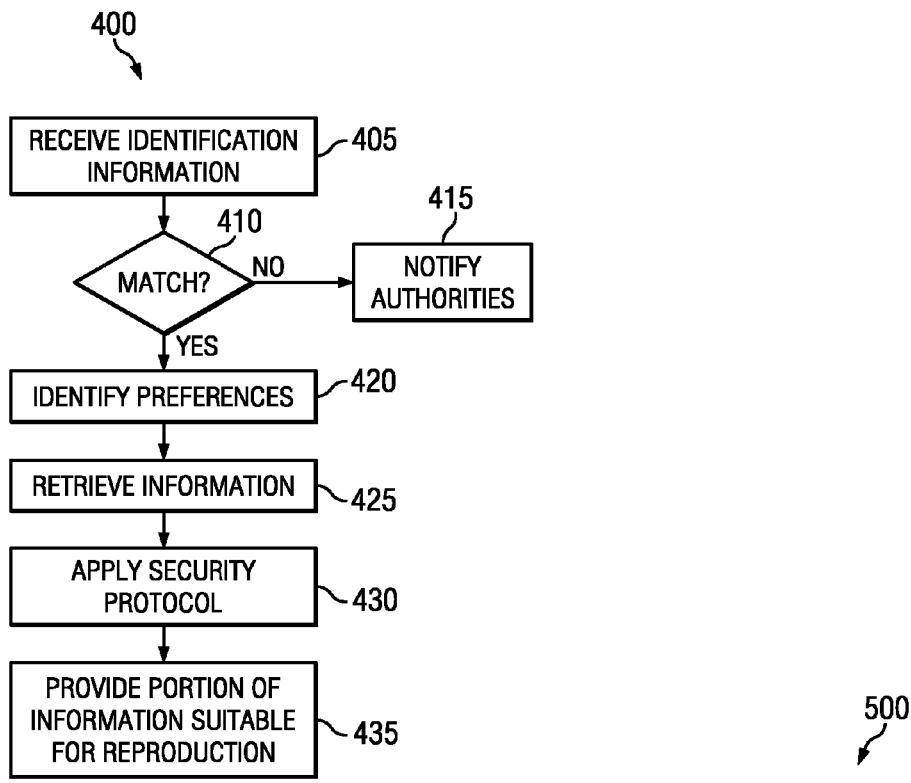
FIG. 4 is a flowchart of a method of providing information to a resident of a controlled-environment facility via a communication device interface according to some embodiments.
Figure 5:
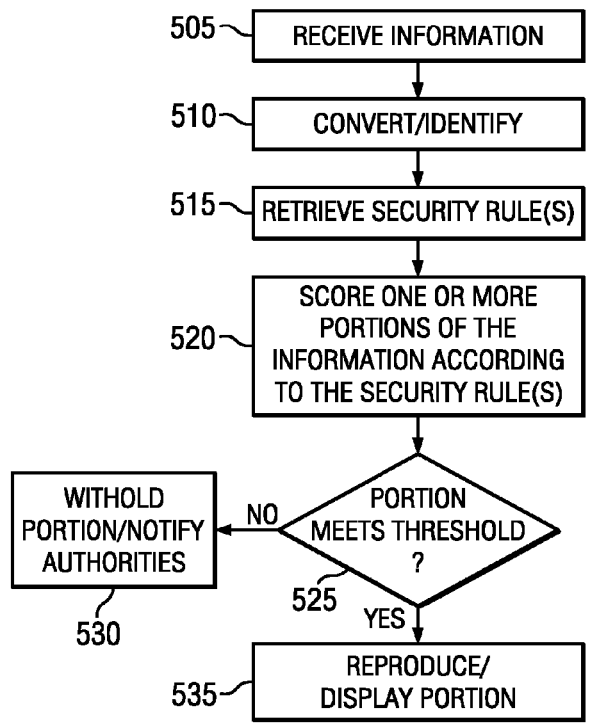
FIG. 5 is a flowchart of a method of implementing interface security techniques according to some embodiments.

In various embodiments, modules 200-245 shown in FIG. 2 may represent sets of software routines, logic functions, and/or data structures that are configured to perform operations described herein and particularly with respect to FIGS. 4 and 5. Although modules 200-245 are shown as distinct logical blocks, in other embodiments at least some of the functionality provided by these modules may be combined into fewer blocks. Conversely, one or more of modules 200-245 may be implemented such that it is divided among two or more logical blocks. Moreover, although shown with a particular configuration, in other embodiments these various modules may be rearranged in other ways.

Figure 3:
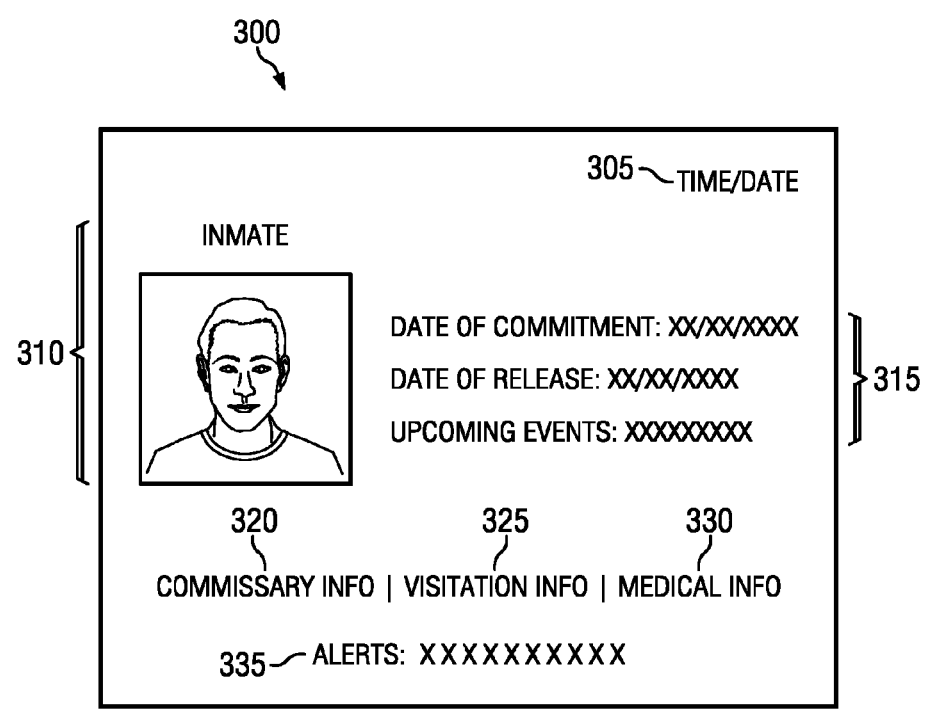
FIG. 3 is a diagram of a graphical user interface (GUI) according to some embodiments.

FIG. 3 is a diagram of a graphical user interface. In some embodiments, interface 300 may be generated by information processing system 105 and/or devices 130A-G executing the system interface software program of FIG. 2. As illustrated, interface 300 may include a time and date field 305 and an inmate identification portion 310. Interface 300 may also include one or more facts obtained from AMS 135 in field 315 (e.g., date of commitment, date of release, upcoming events, etc.), as well as field 320 ("commissary info") containing information obtained from commissary system 130A, field 325 ("visitation info") with information retrieved from visitation system 130B, and field 330 ("medical info") with facts obtained from medical system 130C. Each of these fields may include, for example, a bullet list of facts (e.g., price lists), hyperlinks, or other relevant data. Interface 300 may also include an "alert" section 335 with important information obtained from one or more of systems 115A-I, AMS 135, or manually entered by the facility's administration.

In some implementations, once one or more of devices 130A-G authenticates an inmate, the device may present interface 300 with information requested in the inmate's preferences file or required by facility 100. In some cases, concurrently with the graphic display, devices 130A-G may reproduce an audio version of the corresponding information (e.g., through a device's handset, speakers, etc.). The information played via audio may match and/or complement the information displayed on the device's screen. For example, in some cases, the audio portion of the interface may reproduce more or less information than shown on the display (e.g., the audio portion of the interface may play only the contents of alert section 335 or other important field(s)). Additionally or alternatively, a pre-recorded or real-time audio (or video) message from a warden or jail official may be provided to the inmate. In some situations, such a message may be particular to that inmate; in other situations, a same message may be broadcast to a group of two or more (or all) inmates. Also, depending upon the type of device (e.g., tablet 103G), the inmate may be allowed to navigate the interface (e.g., via a touchscreen, pointing device, remote control, voice commands, etc.) to obtain more detailed information about a particular topic, access and modify its interface preference file, perform certain transactions (e.g., make a commissary purchase, schedule or modify a video visitation, etc.).

As noted above, interface 300 may be implemented as a graphical user interface (GUI) or a web-based user interface using well-known web-based technologies (e.g., HTML, Java™, etc.). It should be also noted, however, that interface 300 is presented for sake of illustration only, and that numerous variations are contemplated. For example, in some cases, interface 300 may be split into two or more portions, a first portion showing information requested by the inmate and a second portion showing information provided by facility 100 irrespective of the inmate's preferences. In other cases, interface 300 may include a section configured to display an electronic advertisement (e.g., graphical banners, audio, etc.) or the like.

FIG. 4 is a flowchart of a method of providing information to a resident of a controlled-environment facility. In some embodiments, method 400 may be performed, at least in part, by information processing system 105 and/or devices 130A-G. At block 405, method 400 may include receiving inmate identification information. Examples of identification information may include a personal identification number (PIN), bar code, password, voice sample, iris or facial image, RFID bracelet, etc. At block 410, if the received identification information does not match information stored in AMS 135, for example, then an alert may be generated at block 415 to notify the proper authorities of a potential security violation. Otherwise, at block 420, method 400 may include retrieving one or more preference files associated with the authenticated inmate.

In some cases, a retrieved preferences file may indicate that the device's interface show information about a particular stock, for example. As such, at block 425, method 400 may include retrieving the requested information from an appropriate source or system. In the previous example, the stock information may be retrieved from a given one of third party content providers 105D. Additionally or alternatively, the stock information may be retrieved from physical storage management module 205. More generally, block 425 may include retrieving locally stored information and/or remotely stored information depending upon the type of information requested, the timestamp of locally stored information, etc.

At block 430, method 400 may include applying a security protocol to the retrieved information. These operations are described in more detail with respect to FIG. 5 below. At block 435, method 400 may include providing the retrieved information (or a portion of the information that is suitable for reproduction, depending upon the outcome of block 430) to an inmate via device 130A-G. In various implementations, block 435 may include generating the graphical user interface shown in FIG. 3 and/or reproducing an audio signal that describes at least a portion of the retrieved information. Accordingly, block 435 may include aggregating information retrieved from two or more distinct sources in a format suitable for presentation by a respective one of devices 130A-G.

In some cases, method 400 may also enable a resident to interact with information processing system 105 and/or devices 130A-G in additional ways. For example, assume that the information retrieved at block 425 is the inmate's PAC list. In that case, method 400 may include receiving a request from the inmate to add or remove a person from the PAC list. Such a request may be received, for example, verbally, via a touchscreen interface, or the like. Information processing system 105 and/or devices 130A-G may approve or deny the request, for example, based on information stored in AMS 135, communication restrictions, etc. Accordingly, method 400 may also include notifying the requesting inmate of its decision to approve or deny the request.

FIG. 5 is a flowchart of a method of implementing security techniques. In some embodiments, method 500 may be performed, at least in part, by security module 235 of the software shown in FIG. 2, and may be executed, at least in part, by information processing system 105 and/or devices 130A-G. At block 505, method 500 may include receiving a particular fact or information. At block 510, method 500 may include converting the information (e.g., audio-to-text, image-to-text, etc.) or otherwise preforming one or more identification operations (e.g., image recognition) upon the information. At block 515, method 500 may include retrieving one or more security rules, for example, from AMS 135. Such a security rule may be generally applicable to all inmates within facility 100, to a group of inmates, and/or to individual inmates. For example, a general rule may forbid access to pornographic material. Meanwhile, a rule associated with a particular inmate may prohibit contact with a particular individual (e.g., a potential victim, a person subject to a protective order, etc.).

At block 520, method 500 may include subjecting the retrieved information to the security rules and scoring one or more portions of the information according to those rules. For instance, a webpage may include text that is otherwise suitable for display to an inmate, but it may also include a picture that is unsuitable for reproduction. In that case, a first portion of the webpage may be scored differently from the second portion. In some embodiments, the scoring may be "pass/fail" such that, in the previous example, the text would "pass" and the "image" would fail. (Another example would be if the information includes an indication of its source, in which case the source's identity may be withheld.) Additionally or alternatively, the scoring may include values such that a score above a threshold may indicate a pass and below the threshold may indicate a fail (or vice versa).

At block 525, method 500 may determine, for each identified portion, whether the information' scoring meets a threshold value. If it does, then the information is flagged as suitable for display/reproduction to the inmate and provided at block 535. Otherwise, the offending portion may be withheld and an alert may be generated to notify proper authorities.

To illustrate the operation of blocks 525-535, assume that movies, songs, and other content available for purchase by inmates are rated on a sliding scale according to violence, language, etc. As a hypothetical example, assume that song A has a score of 8.5 and song B has a score of 1.2, the higher score representing more suitability for reproduction within facility 100. (These scores may be generated by the content vendor, may result from an analysis performed by information processing module 105, or may be manually provided by a human reviewer.) Also assume a security protocol such that an individual inmate cannot purchase songs with a score below 8.0. In that scenario, if that individual inmate requested (e.g., via his or her preferences file) to receive information about new song releases via interface 300, a new release catalog provided by system 115D that would otherwise include songs A and B may have song B removed by blocks 525 and 530. However, song A may still be identified in interface 300 by operation of blocks 525 and 535. As previously noted, individual inmates or groups of inmates may be subject to different rules, and therefore different suitability or security thresholds.

Figure 6:
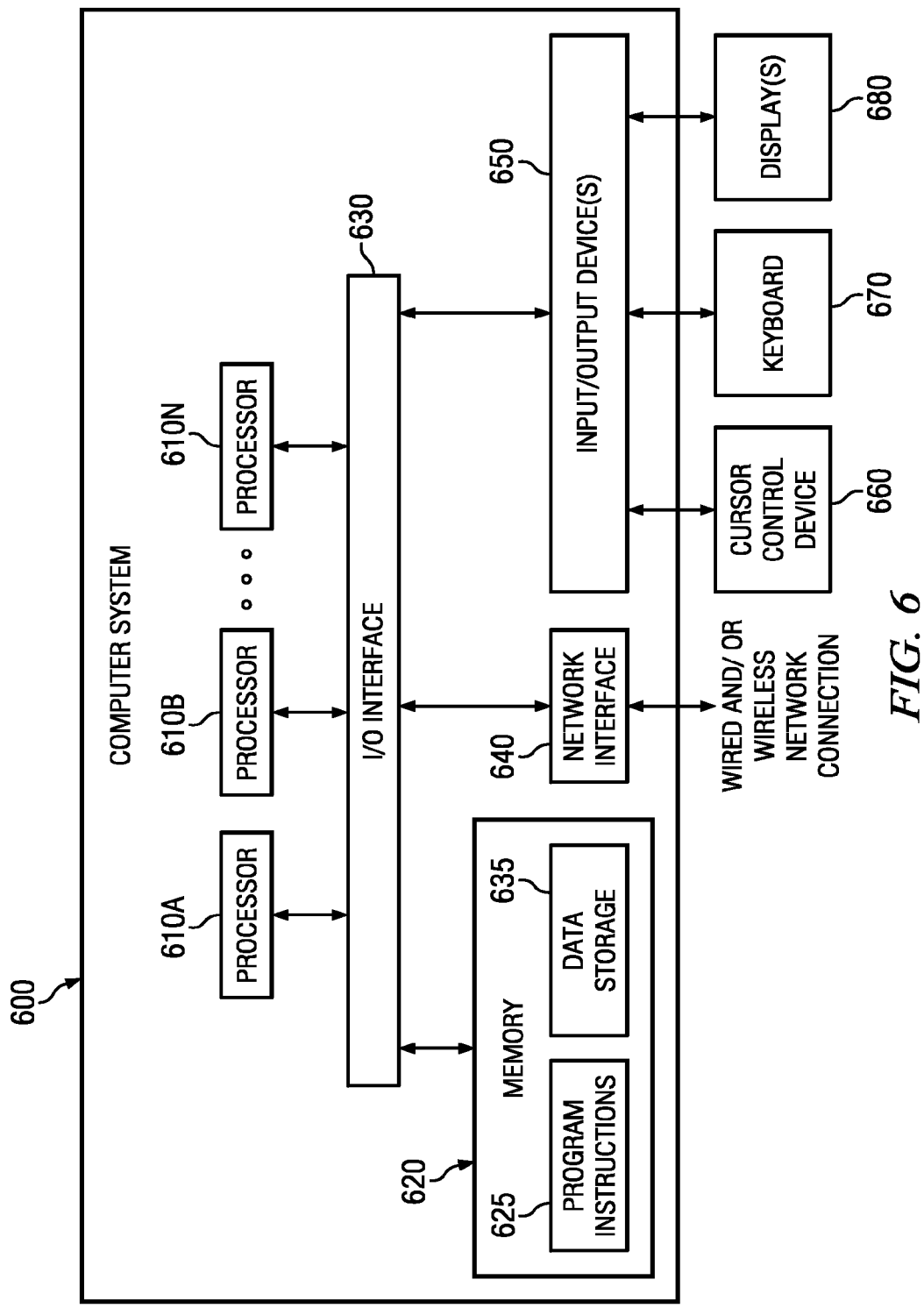
FIG. 6 is a block diagram of a computer system configured to implement various systems and methods described herein according to some embodiments.

As noted above, embodiments of systems and methods for developing, manufacturing, deploying, providing, and/or operating communication device interfaces may be implemented or executed by one or more computer systems. One such system is illustrated in FIG. 6. In various embodiments, system 600 may be a server, a workstation, a desktop computer, a laptop, a tablet computer, a mobile device, a smart phone, or the like. In some cases, system 600 may be used to implement communication system 120, AMS 135, systems 105 and/or 115A-I, and/or one or more of devices 130A-G.

As illustrated, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, display(s) 680, and/or mobile device 690. Other devices 650 may include, for example, cameras, microphones, etc. In some embodiments, system 120 may be implemented using a single instance of computer system 600, while in other embodiments multiple such systems, or multiple nodes making up computer system 600, may be configured to host different portions of a given electronic device or system.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described above in connection with FIGS. 3-5, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-accessible medium may include any tangible storage media or memory media such as electronic, magnetic, or optical media—e.g., disk or CD/DVD-ROM coupled to computer system 600 via I/O interface 630. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, mobile devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement certain embodiments described herein, and data storage 635, comprising various data accessible by program instructions 625. In an embodiment, program instructions 625 may include software elements of embodiments illustrated in the above figures. For example, program instructions 625 may be implemented in various embodiments using any desired programming language, scripting language, or combination of programming languages and/or scripting languages (e.g., C, C++, C#, Java™, JavaScript™, Perl, etc.). Data storage 635 may include data that may be used in these embodiments (e.g., recorded communications, profiles for different modes of operations, etc.). In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for virtual telephone system interfaces. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method implemented in a computer system disposed within a controlled-environment facility, the computer system having a processor and a memory device coupled to the processor, the memory device having program instructions stored thereon that, upon execution by the processor, configure the computer system to provide a virtual communication device interface, the method comprising:
   receiving identification from an inmate incarcerated within the controlled-environment facility;
   authenticating the inmate based upon the identification;
   retrieving information from one or more of a plurality of electronic information sources over a computer network,
   identifying preferences associated with the inmate based, at least in part, upon the identification, wherein the preferences indicate one or more types of information selected by the inmate;
   retrieving data corresponding to the one or more selected types of information; and
   scoring the retrieved data based on one or more security rules, wherein a first portion of the retrieved data is scored according to a first security rule, and wherein a second portion of the retrieved data is scored according to a second security rule;

determining whether the first portion of the retrieved data is prohibited based on the scoring of the first portion;

determining whether the second portion of the retrieved data is prohibited based on the scoring of the second portion; and providing the first portion of the retrieved data to the inmate if the first portion is not prohibited; and providing the second portion of the retrieved data to the inmate if the second portion is not prohibited.

2. The method of claim 1, wherein the identification from the inmate includes at least one of biometric information, a radio frequency identification (RFID) code, or a personal identification number.

3. The method of claim 1, wherein the information retrieved from the one or more of the plurality of electronic information sources includes a telecommunication Pre-Approved Contact (PAC) list associated with the inmate.

4. The method of claim 3, further comprising:
receiving a request from the inmate to add or remove a person to the telecommunication PAC list; and
approving the request, if the inmate is not prohibited from contact with the person.

5. The method of claim 3, further comprising:
receiving a request from the inmate to add or remove a person to the telecommunication PAC list; and
denying the request, if the inmate is prohibited from contact with the person.

6. The method of claim 3, further comprising:
receiving a request from the inmate to add or remove a person to the telecommunication PAC list;
deciding whether to approve or deny the request; and
notifying the inmate of the decision.

7. The method of claim 1, wherein the one or more of the plurality of electronic information sources includes an administration and management system, and wherein the information includes data related to one or more of: an elapsed residency period, a remaining residency period, a commitment date, a release date, or a hearing schedule.

8. The method of claim 1, wherein the one or more of the plurality of electronic information sources includes a communication system, and wherein the information includes data related to one or more of: a call history, an address book, or a balance available in a calling account.

9. The method of claim 1, wherein the one or more of the plurality of electronic information sources includes a cafeteria database, and wherein the information includes data related to one or more meals served at the controlled-environment facility.

10. The method of claim 1, wherein the one or more of the plurality of electronic information sources includes a laundry database, and wherein the information includes data related to one or more laundering services available.

11. The method of claim 1, wherein the one or more of the plurality of electronic information sources includes a vending machine database, and wherein the information includes data related to one or more selections from the vending machine.

12. The method of claim 1, wherein the one or more of the plurality of electronic information sources includes a cosmetic database, and wherein the information includes data related to one or more services related to cosmetology.

13. The method of claim 1, wherein the one or more of the plurality of electronic information sources includes a medical database, and wherein the information includes data related to one or more of: an appointment or a prescription.

14. The method of claim 1, wherein the one or more of the plurality of electronic information sources includes a commissary system, and wherein the information includes data related to at least one of: a purchase history, a commissary item price list, or a commissary account balance.

15. The method of claim 1, wherein the one or more of the plurality of electronic information sources includes a video visitation system, and wherein the information includes data related to the given inmate's past, present, or future visitation schedule.

16. The method of claim 1, wherein the one or more of the plurality of electronic information sources includes a third-party content provider accessible over the Internet, and wherein the information includes data related to one or more of: news, weather, stocks, sports, entertainment, or electronic media.

17. The method of claim 1, wherein providing the first or second portions of the retrieved data further comprises:
converting information from a text format to a graphical or audio format; and
reproducing the converted information to the inmate through a computing device.

18. The method of claim 1, wherein the scoring of the retrieved data is based in part on the source of the retrieved data.

19. A system, comprising:
at least one processor; and
a memory coupled to the at least one processor, the memory configured to store program instructions executable by the at least one processor to cause the system to:
identify preferences associated with an inmate, wherein the preferences indicate one or more types of information selected by the inmate;
receive media catalog information for a media catalog, wherein the media catalog information includes a plurality of media files available within a controlled-environment facility, and wherein the media catalog information is selected based on the identified preferences;
scoring the received media catalog information based on one or more security protocols associated with the inmate, a first portion of the media catalog information is scored according to a first security protocol; and wherein a second portion of the media catalog information is scored according to a second security protocol;
determining whether the first portion of the media catalog information is allowed based on the scoring of the first portion;
determining whether the second portion of the media catalog information is allowed based on the scoring of the second portion; and
transmit the allowed portions of the media catalog information to the inmate via an electronic device disposed within the controlled-environment facility.

20. The system of claim 19, wherein the plurality of media files include music or video files.

21. The system of claim 20, wherein the scoring of the received media catalog information assigns a value to each media file, wherein the value indicates the suitability of a media file for an inmate based on the security profile associated with the inmate.

* * * * *